United States Patent [19]

Van De Vliert

[11] Patent Number: 4,722,408
[45] Date of Patent: Feb. 2, 1988

[54] WEIGHING DEVICE

[76] Inventor: Jakob Van De Vliert, 6733 AE Wekerom, Edeseweg 2, Netherlands

[21] Appl. No.: 829,496

[22] Filed: Feb. 14, 1986

[51] Int. Cl.⁴ .................. G01G 21/00; G01G 19/08; G01G 3/08; G01G 21/28
[52] U.S. Cl. .................................. 177/126; 177/139; 177/229; 177/244
[58] Field of Search ............... 177/126, 244, 229, 139

[56] References Cited
U.S. PATENT DOCUMENTS
3,910,363 10/1975 Airesman .......................... 177/139

Primary Examiner—George H. Miller, Jr.
Attorney, Agent, or Firm—Larson and Taylor

[57] ABSTRACT

Weighing device mountable between a three-points lifting means of a tractor and a load or apparatus to be weighed, said device having two parallel frames adjacently connected to each other for limited movement, a measuring means being mounted between the frames, the connection between the frames being realized by means of stiff elastically deformable strips such as strips of stainless steel, covered at one or both sides with stiffening plates leaving only a small flexion region or by strips mounted to the upper and lower sides of the frames.

11 Claims, 9 Drawing Figures

WEIGHING DEVICE

The invention relates to a device for weighing a load or apparatus attachable to a three-points lifting means of a tractor, such as an agriculture tractor.

Analysis of the problems relating to such a weighing device revealed, that only the combination of very high robustness and high accuracy could lead to an acceptable device. The high robustness exigency is due to many factors:

First of all the connection between a tractor and an apparatus supported by it is exposed to considerable and highly irregular forces due to horizontal and vertical accelerations as well as dynamical torques, for instance when the tractor rotates about its longitudinal axis when one of its big wheels meets a pothole or runs over a lump, or even the one meets the pothole and the other the lump.

A further source of undue forces and even shocks is to be found in the fact, that during the work with an apparatus it is very well possible that very strong reaction forces occur, for instance if the apparatus is a device for cutting and removing blocks of hay or other fodder such as preserved mowing grass, which device has to be driven against a hay stack or suchlike stock. In practice the temporary forces transmitted by the apparatus or the load may be up to ten times the average load forces at rest.

In this respect it should be kept in mind, that such a weighing device has to be suitable for a large range of activites, such as cutting and weighing hay or mowing grass, weighing all other types of fodder, dispensing controlled quantities of fodder or other materials, weighing a fertilizer at work in order to deduce from the weight the quantity of fertilizer material already dispensed and simply weighing for instance cattle. Of course even more applications are conceivable, such as weighing crops when collecting them, but in all cases any weighing device of this type has to be resistant to all types of heavy and irregular loads.

It is remarked that weighing devices to be mounted on vehicles having sufficient rigidity in horizontal direction have been shown in the U.S. Pat. Nos. 3,279,550 and 2,968,475. The special problems originating from the suspension of an apparatus of load to for instance the three-points lift device of a tractor, especially the rather long lever to which the load is suspended and the vertical or nearly vertical position of the frames have not been dealt with in these publications.

In U.S. Pat. No. 3,279,550 two frames are located above each other and can bend with respect to each other, a load cell being mounted in the centre of the frames.

U.S. Pat. No. 2,968,475 shows two frames mounted above each other, pivot levers being provided to transmit a predetermined fraction of the load to a load cell, whereas balls are used to prevent relative movement of the frames in the direction of the pivot axes of the levers.

According to the invention the above indicated robustness in principle is obtained by provided a device for weighing a load or apparatus having a first frame which is attachable to a three-points lifting means of a tractor and a second frame adapted to support a load or apparatus, which frames are mutually connected to each other by at least three link members, each of which is connected at its ends to the first and the second frame respectively, said link members having a central region having a higher stiffness than at least one region located between said central region and one of the said ends, said frames forming together with said links in side view a parallelogram-like structure, a weight measuring means being present to measure weight forces working between said frames.

With the expression "in side view a parallelogram-like structure" is meant that the side view of the frames and the link members is a parallelogram, but that the location of the links in the transverse direction need not to be such that two of them are located in one vertical plane.

In fact normally there will be at least two links at the lower side of the frames leaving a free space between them, whereas at the upper side the links will be far nearer to each other or even a single link will suffice.

Because the weighing device has to allow free space for the transmission shaft for driving the apparatus, it is preferably provided that the frames have at their upper side a width which is less than half the width at their lower sides and the frames at their lower sides are open in their centre.

Suitable embodiments of the invention provide that the frames have the shape of an inverted V.

The three-point lifts means of a tractor generally allow for some adjustment in order to allow connection with apparatus having their lower connecting means at different locations in the transverse direction. If, however, a weighing device is interposed between the tractor and the apparatus, this adaption facility is lost. In order to restore this facility in a simple and reliable manner a further elaboration of the invention provides that the second frame at its lower side is provided with extendable connection means for attaching the apparatus or load to be weighed.

It has already been explained that the lines have to be resistant to irregular loads of all types for instance strong forces in the longitudinal direction and twisting or torque loads.

An embodiment of the invention which is very favourable in this respect provides that the link members are strips of elastically deformable material, the free portions of the strips between their connections to the frames having successively a bending region, a central region and a further bending region, the bending regions having a length and a stiffness which are smaller than those of the central region.

A preferred mounting of the strips consists in that the link members are strips connected to the frames by providing a sandwich construction of a mounting bar, an end portion of a strip and a cover bar, welded together along their common outer sides.

When both bars and the strip are made of the same material, such as stainless steel, contact corrosion of the strip is avoided.

The mounting and cover bars may be of several shapes and can for instance consist of vertical plates, the edges of which are flush with the strips.

Herewith the welds are preferably only made at the three sides of the strip, and not at the side opposite the other frame, so that the bending region of the strip has no weld adjacent to it, which means that its flexibility is not influenced by the welding material or temperature.

In order to combine sufficient flexibility with sufficient resistance to twisting loads the strips have to be rather thin but should have a rather important width. Favourable results have been obtained with a width of 150 mm, a length of 180 mm, which corresponds to a free length of the strips of 130 mm and a thickness of the strip of 2 mm. In that instance the strip was covered at both sides with stiffening plates welded to it along the longitudinal edges, the flexing or bending zone between these plates and the mounting of the strips to the frames being about 2 mm. Of course deviations of these values are possible without leaving the domain of the invention.

A suitable embodiment of the load cell and its mounting is obtained by providing that one of the frames is rigidly connected to a load measuring member mounting and the other to a further member adapted to engage the load measuring member, one of the said members being provided with a circular bore and the other with a ball engaging the edge of said bore, a pin extending from said ball through said bore and being provided with a locking member preventing removal of the said pin from the said bore.

A favourable embodiment of the frames, which allows for a maximum height between the strips and is sufficiently strong with only three strips is obtained by providing that one of the strips is attached at the upper side of the central portions of both frames and the other two of them being connected to the lower sides of the frames.

This embodiment of the invention increases the robustness of the device by increasing the distances between the link members as much as possible without unduly increasing the dimensions of the frames themselves.

In the following the invention will be elucidated on had of the drawings, in which.

Figure 1:
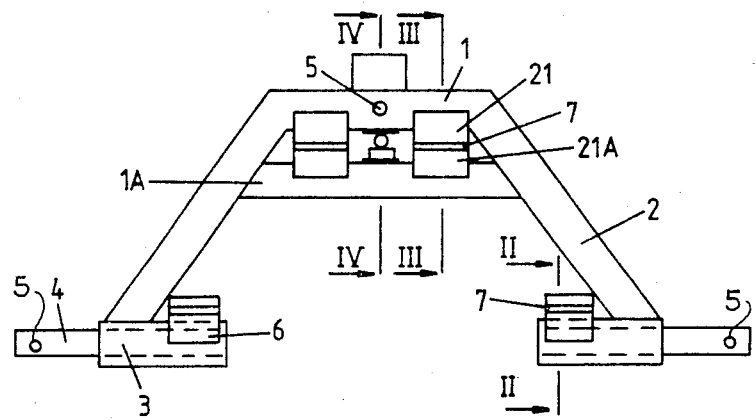
FIG. 1 is a front elevation of an embodiment of the invention, seen from the side of an attached apparatus.
Figure 1A:
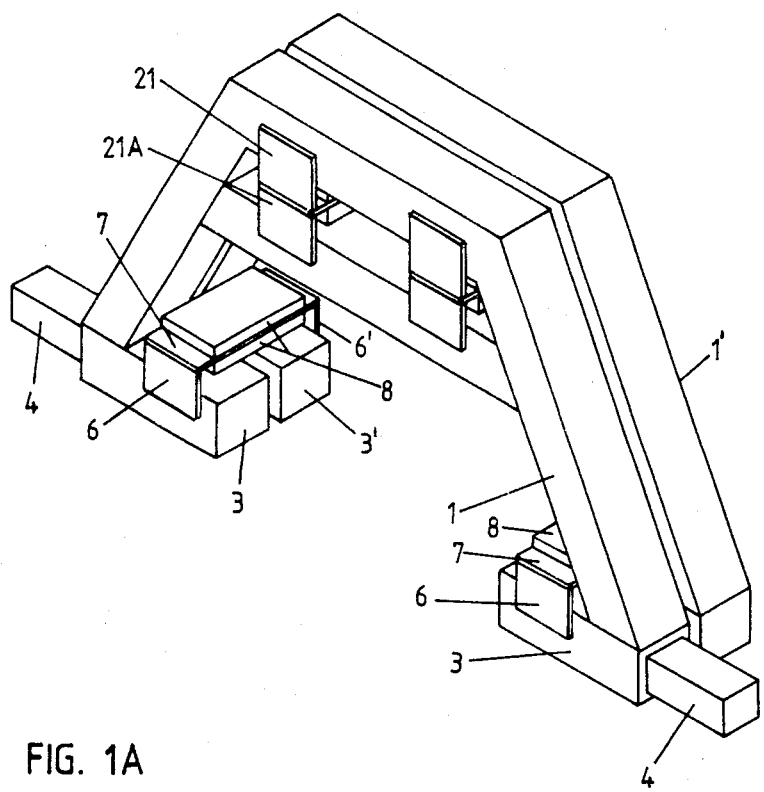
FIG. 1A is a perspective view of the embodiment shown in FIG. 1.

FIG. 1 shows a frame with a short upper beam 1, obliquely downwardly directed side beams 2 and two hollow lower beam parts 3. In the beam parts 3 slidable adjustment members 4 protrude, which can be fixed in these beam parts in any suitable way, not further shown. The adjustment members 4 include connection points 5 thereon. A connection point 5 is mounted in the centre of the upper beam 1. Preferably this connection point is vertically adjustable, because not all apparatus suitable for mounting to a tractor are normalized. Similar connection points 5 are provided on adjustment members 4, as shown in FIG. 1. Any load or apparatus is mounted to connection points 5 in a way which is identical to the way in which the load or apparatus is normally mounted to a three-point attachment of an agricultural tractor. The frame member including beams 1, 1A and 4 is connected to the three-point attachment of a tractor in a standard manner such that the weighing device is located between the tractor and the load.

A second horizontal beam 1A is located at a relatively small distance from bean 1 and contributes to the stiffness of the frame, the beam 1A cooperating with the beam 1 for effectively mounting strips and weight determining members, as will be discussed further on.

Figure 2:
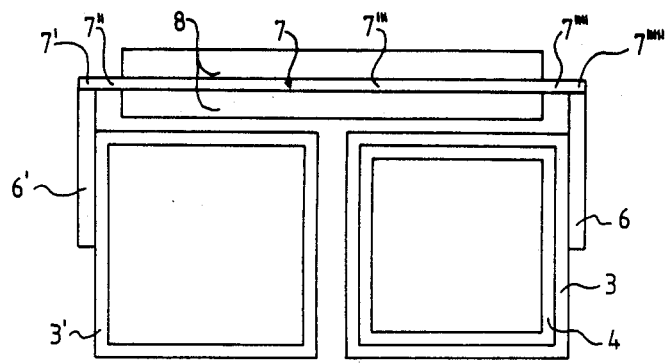
FIG. 2 is a partial cross-section on an enlarged scale taken over the line II—II of FIG. 1.

As more specially follows from FIG. 2 the frame formed by the beams 1, 1A and 2 is at its lower beam parts 3 connected to corresponding lower beam parts 3' of a corresponding shaped frame, which, however, has no adjustment members 4, but fixed non shown members for attachment to a three-points lift mechanism of an agricultural tractor.

Support plates 6 and 6' are welded to beam portions 3 and the corresponding beam portion 3' of the other frame.

A strip 7 is welded to the upper edge of plates 6 and 6'. Strip 7 has firstly a narrow edge 7' welded to plate 6', then a rather short free section 7", then a part 7'" enclosed between two stiffening plates 8, again a free section 7"" and an edge 7""', welded to plate 6. Due to the flexible sections 7" and 7"" this connection can easily yield in vertical direction, but due to the plates 8 and the very restricted length of the sections 7'" and 7"" rather important horizontal forces can be transmitted.

Figure 3:
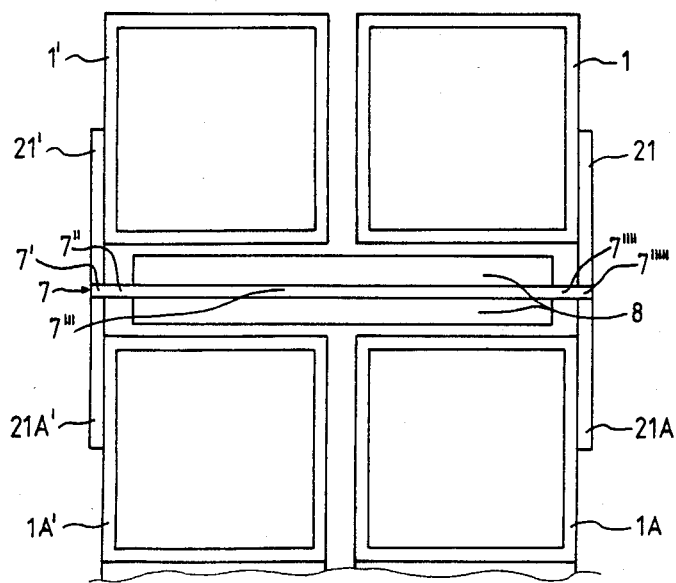
FIG. 3 is a partial cross-section on the same enlarged scale, taken over the line III—III.

FIG. 3 shows the same type of connection using a strip 7 stiffened by plates 8, but here the one edge of the strip 7 is welded to an upper plate 21 welded to beam 1 and to a lower plate 21A welded to beam 1A. The other edge is welded in the same way to plates 21' and 21A'. For the same reasons strip 7 of FIG. 3 is vertically flexible but horizontally rather rigid.

Figure 4:
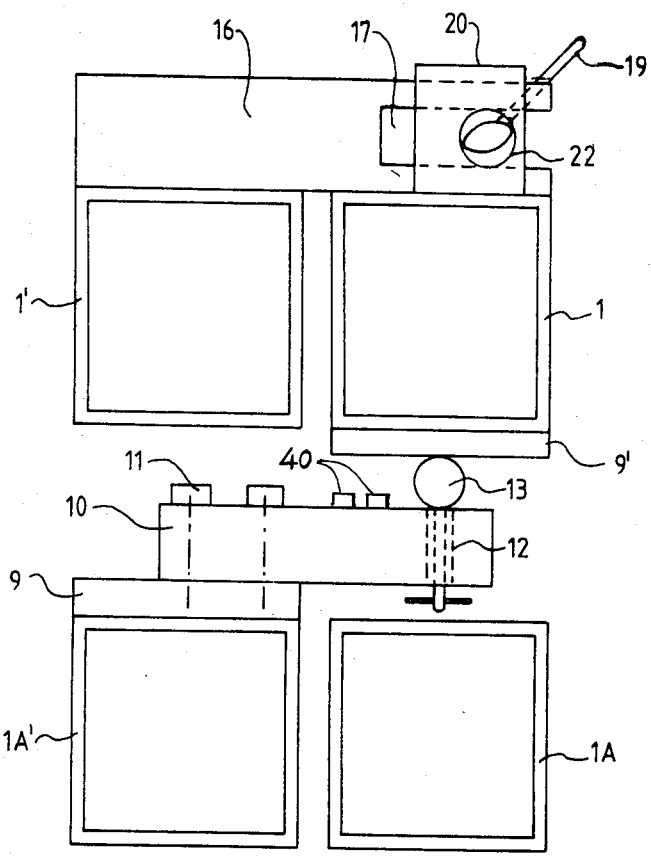
FIG. 4 is a cross-section on the same scale as FIGS. 2 and 3, taken over the line IV—IV of FIG. 1.

FIG. 4 shows a section over the line IV—IV of FIG. 1, showing again beams 1, 1A, 1' and 1A'.

Beam 1A' has been provided with a mounting plate 9 to which a deformable beam 10 has been connected by means of bolts 11. The beam 10 is provided with straingauges as is well known per se in order to measure the deformation due to weight loads. The electrical system for determining the weight of anything mounted to frame 1, 2, 3 is also known per se and no part of the invention. In practice an electrical processor unit can be used, which can be tared to zero when an apparatus does not contain any matter to be weighed, so that afterwards the indication of the weight corresponds to the weight of the matter to be weighed and still present in the apparatus.

At its other side beam 10 is provided with a circular bore 12 on which a ball 13 rests. The upper side of ball 13 engages a plate 9' mounted to beam 1.

Figure 5:
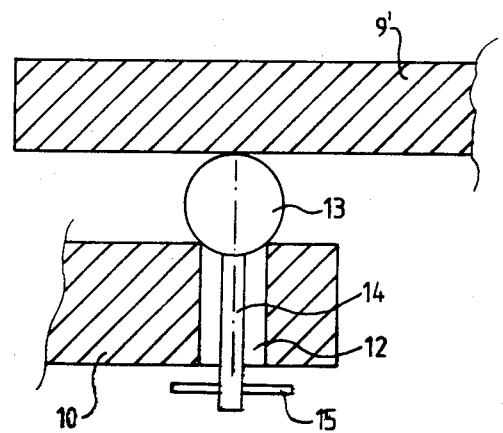
FIG. 5 shows a detail.

As has been shown more clearly in FIG. 5 a pin 14 is mounted to ball 13 and passes through bore 12. A locking pin 15 prevents the unit 13, 14 to leave bore 12.

The shown construction with ball 13 and bore 12 has the advantage of a line contact permitting high loads but always having the forces working in the central axis of bore 12. Further it should be kept in mind, that when using the apparatus in agricultural environments, it is very well possible that dirt or other undesired material will come between beam 10 and ball 13. Because of the rather sharp edge such material will be cut so that beam 10 and ball 13 engage each other again over a complete circle, whereas any dirt in the bore will simply fall down.

Further FIG. 4 shows a blocking device for preventing relative vertical movements of the beams 1 and 1'. A rigid beam 16 has been welded to beam 1' and at its other side is provided with a slot 17.

Attached to beam 1 are two mounting plates 20 having a bore 22 in which a shaft can rotate which has an oblong or elliptic section in the slot 17 and can be rotated by lever 19 in order to block the beams 1 and 1' with respect to each other.

Figure 6:
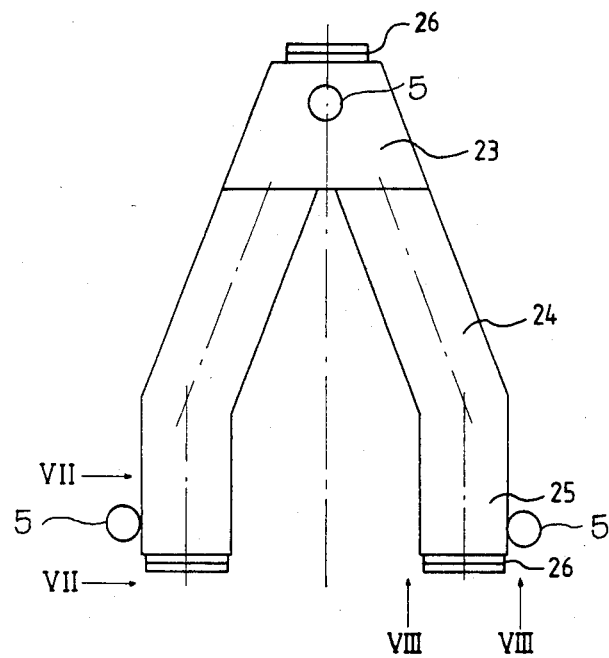
FIG. 6 is a schematical front elevation of a further embodiment.

FIG. 6 shows schematically a front view of a further embodiment of the invention. In FIG. 6 the means for sensing the weight load of one of the frames and the adjustment means for the connection members for attaching a load or apparatus have been omitted.

The frame shown in FIG. 6 has an upper trapezium shaped part 23 and two legs 24 having a rectangular cross-section and being bent such that the lower parts 25 are parallel and mainly vertical when the frames are in use.

At the upper side of trapezium 23 and at the lower side of the leg parts 25 strip mountings 26 are provided. One of these strip mountings has been shown in FIG. 7. This view shows two bars 27 and 28 on the leg parts 25 and its counter part 25' of the other frame. Bars 27 and 28 and the strip 29 interposed between them are made of stainless steel. Bar 27 is welded to leg part 25, which is made of normal construction steel. Any welding stresses, including those due to differing physical properties of the different materials are restricted to the contact region of the bar 27 with leg part 25.

Figure 8:
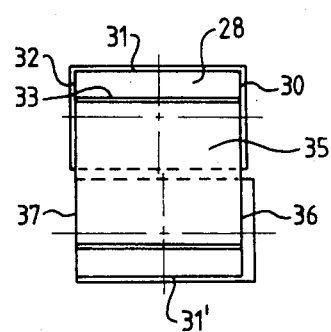
FIG. 8 is a bottom view of part of the embodiment of FIG. 6 taken along lines VIII—VIII.

The strip 29 is welded at three sides of bars 27 and 28 indicated in FIG. 8 with 30, 31 and 32. At the fourth side 33 of these bars no welding connection with strip 29 is made.

Further two stiffening plates 34 and 35 are welded to strip 29 along the sides 36 and 37.

Between the bars 27 and 28 on the one hand and the plates 34 and 35 on the other hand a relatively narrow free flexing zone of strip 29 is present. In a practical case the strip 29 had a dimension (from 31 to the counterpart 31' of it at the other frame) of 180 mm and a dimension perpendicular thereto of 150 mm. The width of the free zones between the bars 27, 28 and the plats 34, 35 was 2 mm; the width of the bars 25 mm and consequently the length of the plates 34 or 35 was 126 mm. The bars 27 have to have a sufficient thickness to leave the plates 34 free from the frame parts 25 and 25'. The plates 34 and 35 have to have such a thickness that the strip between them can be exposed to compression forces in the direction from one set of bars 27, 28 toward the other without risk that the strip will kink or crack. For the same reason the free zones of the strip between the bars 27, 28 and the plates 34, 35 is so narrow that there no kinking or cracking of the strip will occur.

Figure 7:
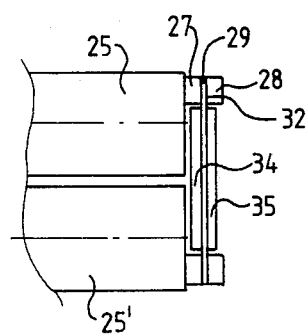
FIG. 7 is a partial side elevation along the lines VII—VII of FIG. 6.

The embodiment of FIGS. 6, 7 and 8 has the advantage of a maximum vertical distance between the strip mountings 26 and a simple design without complications permitting a relatively cheap production.

The invention in first instance is suitable for agricultural purposes, where it is of great importance to know the weight of all sorts of things, as well as those which have to be bought or sold, such as crops, straw, hay or cattle, as of apparatus in order to known the weight of dispensed or collected materials. Higher dosage accuracy is highly desired in this field, as well with rearing or keeping cattle as for instance with fertilizing grounds. Therewith it is a great advantage of the invention that it is extremely light to transport and can be used with riding devices.

It is, however, conceivable that the invention is also used in other fields and such uses are of course also covered by this invention.

What I claim is:

1. Device for weighing a load or apparatus, said device comprising a first frame which is attachable to a three-point lifting means of a tractor and a second frame including means for connecting the second frame to the load or apparatus so as to support the load or apparatus, said frames being mutually connected to each other by at least three link members, each of said link members being connected at its ends to the first frame and the second frame respectively, said link members each comprising horizontally extending elastically deformable strips and each strip including a central region and first and second end regions respectively located between the central region and the ends of links connected to the respective frames, said central region being longer than, and having greater thickness and stiffens than, said first and second regions, and the lower ends of said frames each defining a central open space, said frames forming together with said links in side view a parallelogram-like structure, and said device further comprising a weight measuring means for measuring weight forces working between said frames.

2. Device according to claim 1, in which the frames have the shape of an inverted V.

3. Device according to claim 1, in which the second frame includes at the lower end thereof extendable connection means for attaching the second frame to the apparatus or load to be weighed.

4. Device according to claim 1, in which the central region is formed by a stiffening plate welded to the strip.

5. Device according to claim 4, in which two plates are welded to a said strip to form said central region, one plate being welded to the one side of said strip and the other plate being welded to the other side of said strip.

6. Device according to claim 1, in which the strips are made of a material from the group consisting of steel and stainless steel, the lengths of the said first and second regions being less than 10 mm.

7. Device according to claim 6, in which the strips are made of stainless steel, and have a thickness of less than 2.5 mm, a width of more than 10 cm and a length of more than 10 cm.

8. Device according to claim 1, in which one of the frames is rigidly connected to a lead measuring member mounting and the other of said frames is connected to a further member adapted to engage the load measuring member, one of the said members being provided with a circular bore and the other with a ball engaging the edge of said bore, said device further comprising a pin extending from said ball through said bore and being provided with a locking member for preventing removal of the said pin from the said bore.

9. Device according to claim 1 wherein thereof said links are provided, one of said links being attached at the upper end of central portions of both frames and the other two of such links being connected to the lower ends of the frames.

10. Device according to claim 1, in which the link members are strips connected to the frames by providing a sandwich construction of a mounting bar, an end portion of a strip and a cover ball all welded together along their common outer ends.

11. Device for weighing a load or apparatus, said device comprising a first frame which is attachable to a three-point lifting means of a tractor and a second frame including means for connecting said second frame to a load or apparatus so as to support the load or apparatus, said frames being mutually connected to each other by at least three link members, and each of said link members being connected at its ends to the first and the second frame respectively, said link members comprising strips and each of said strips comprising a central region having end regions on opposite side thereof connected to the respective frames, said central region being longer and thicker than said end regions, said frames each including an upper portion and lower portions which are spaced apart to define an opening therebetween, one of said links being mounted to central parts of the upper portions of the frames and two further links being mounted to outer parts of the lower portions of the frames respectively, said frames forming together with said links in side view a parallelogram-like structure, and such device further comprising a weight measuring means for measuring weight forces working between said frames.

* * * * *